United States Patent
Renard

(10) Patent No.: US 7,604,077 B2
(45) Date of Patent: Oct. 20, 2009

(54) REMOVABLE HOOD PANEL

(75) Inventor: Mark Allan Renard, Page, ND (US)

(73) Assignee: CNH America LLC, New Holland, PA (US)

( * ) Notice: Subject to any disclaimer, the term of this patent is extended or adjusted under 35 U.S.C. 154(b) by 307 days.

(21) Appl. No.: 11/779,933

(22) Filed: Jul. 19, 2007

(65) Prior Publication Data

US 2009/0020349 A1 Jan. 22, 2009

(51) Int. Cl.
*B62D 25/10* (2006.01)
(52) U.S. Cl. .................. 180/69.2; 180/69.24
(58) Field of Classification Search .............. 180/69.2, 180/69.24, 89.17, 900; 296/193.11, 108
See application file for complete search history.

(56) References Cited

U.S. PATENT DOCUMENTS

| | | | |
|---|---|---|---|
| 2,952,328 A | 9/1960 | Steiner | |
| 4,037,682 A | 7/1977 | Sandrock et al. | |
| 4,131,172 A | 12/1978 | Wolfgram | |
| 4,415,052 A | 11/1983 | Gauer | |
| 4,611,680 A * | 9/1986 | Redenbarger et al. | 180/69.24 |
| 4,848,498 A * | 7/1989 | Hart et al. | 180/69.2 |
| 4,889,203 A | 12/1989 | Hagarty | |
| 5,634,525 A | 6/1997 | Templeton et al. | |
| 5,984,037 A | 11/1999 | Duhem | |
| 6,030,029 A | 2/2000 | Tsuda et al. | |
| 6,508,323 B2 | 1/2003 | Burgo | |
| 7,096,987 B2 | 8/2006 | Moen et al. | |
| 2001/0027884 A1 * | 10/2001 | Dennison et al. | 180/69.2 |

* cited by examiner

*Primary Examiner*—Glenn Dayoan
*Assistant Examiner*—Brian Swenson
(74) *Attorney, Agent, or Firm*—Patrick M. Sheldrake; John William Stader; Michael G. Harms

(57) ABSTRACT

An engine enclosure for enclosing an engine of a work machine. The enclosure includes a first panel hingedly supported from an enclosure top and extending downwardly therefrom to form an enclosure side portion. A first hinge device joins the first panel to the enclosure top for pivotal movement relative thereto, the first panel pivotable from a closed position to an open position for access of engine components. A second panel hingedly supports and forms another portion of the enclosure side, extending upwardly toward the first panel. A lower portion of the first panel is configured to overlie an upper portion of the second panel when the first and second panels are in a closed position for preventing pivotal movement of the second panel when the first panel overlies the second panel. The second panel is pivotable from the closed position to an open position for access of engine components.

20 Claims, 5 Drawing Sheets

REMOVABLE HOOD PANEL

FIELD OF THE INVENTION

The present invention relates generally to a hood panel for a work machine such as a loader used for construction, earth moving and other purposes, and more particularly, to a hood panel that is removable without tools.

BACKGROUND OF THE INVENTION

Work machines, such as loaders, typically have large tires disposed adjacent to the front or rear portion of the frame. The engine and other components are conventionally located adjacent to the front or end portion of the frame. Hood panels or engine compartment doors are provided on opposite sides of the engine compartment to permit access of the engine and other components for maintenance or other reasons. Due to the size and position of the wheels, the hood panels are provided with geometries that avoid the wheel, but are affixed at angles and locations requiring the use of fasteners and/or removal of the panel. The remaining portions of the hood also define a hood panel that is typically secured with mechanical fasteners, requiring special tools for installation/removal. Since, these hood panels must also be accessed in order to service engine or other components, the time required to perform such maintenance is significantly increased. In addition, hood panels are subject to noise due to vibration associated with operation of the loader.

What is needed is a hood panel that does not require special tools to achieve access to regions behind the panel and having substantially reduced noise associated with operation of the work machine.

SUMMARY OF THE INVENTION

The present invention relates to an engine enclosure for enclosing an engine of a work machine. The enclosure includes a first panel hingedly supported from an enclosure top and extending downwardly therefrom to form an enclosure side portion. A first hinge device joins the first panel to the enclosure top for pivotal movement relative thereto. The first panel is pivotable from a closed position to an open position for access of engine components without the first panel contacting a drive device of the work machine. A second panel hingedly supports and forms another portion of the enclosure side, extending upwardly toward the first panel. A lower portion of the first panel is configured to overlie an upper portion of the second panel when the first and second panels are in a closed position for preventing pivotal movement of the second panel when the first panel overlies the second panel. The second panel is pivotable from the closed position to an open position for access of engine components.

The present invention further relates to a work machine including an engine and an engine enclosure. The engine enclosure includes a first panel hingedly supported from an enclosure top and extending downwardly therefrom to form an enclosure side portion. A first hinge device joins the first panel to the enclosure top for pivotal movement relative thereto. The first panel is pivotable from a closed position to an open position for access of engine components without the first panel contacting a drive device of the work machine. A second hingedly supported panel forms another portion of the enclosure side, extending upwardly toward the first panel. A lower portion of the first panel is configured to overlie an upper portion of the second panel when the first and second panels are in a closed position for preventing pivotal movement of the second panel when the first panel overlies the second panel. The second panel is pivotable from the closed position to an open position for access of engine components.

An advantage of the present invention is the panel substantially reduces or removes vibration and noise associated with operation of a work machine.

A further advantage of the present invention is the panel does not require tools for removal or installation.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
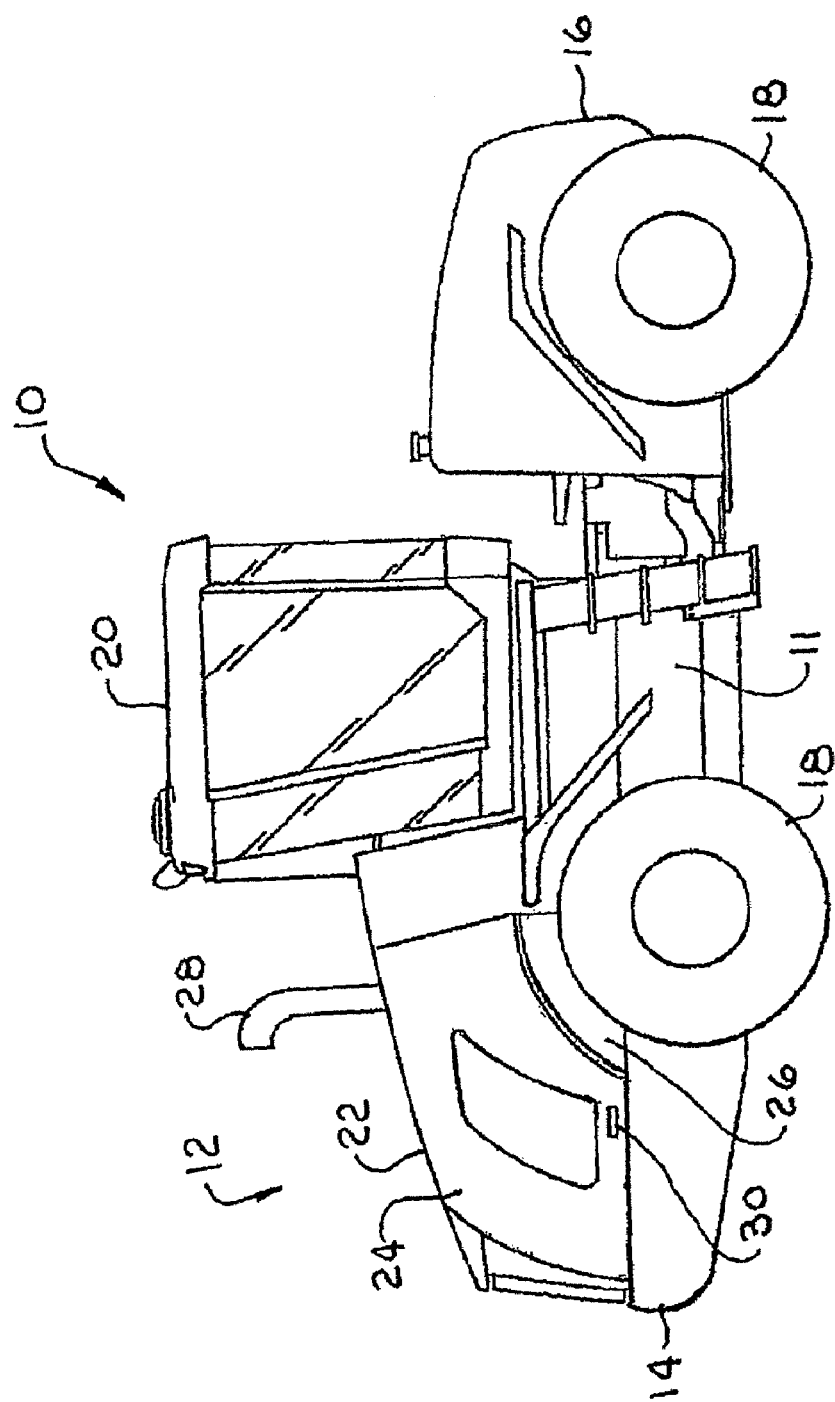
FIG. 1 is an elevational view of a work machine including an embodiment of an engine enclosure in a closed position of the present invention.

Referring now to the drawings, in FIG. 1, an engine enclosure 12 of a conventional work machine 10 is shown, work machine 10 being intended to be representative of a wide variety of work machines such as a loader, used for purposes such as construction, landscaping, agriculture, and the like. Work machine 10 includes a frame 11 supporting a cab 20 that houses an operator therein. Frame 11 rotatably carries a set of drive devices 18, such as wheels or drive tracks or a component arrangement maintained in contact with terrain over which work machine 10 is propelled. Drive devices 18 are disposed between opposed ends 14, 16 of the work machine. As shown in FIG. 1, an engine enclosure 12 is disposed between end 14 and cab 20 for enclosing an engine therein, although in another embodiment an engine enclosure could be disposed between cab 20 and end 16 or also between cab 20 and end 14. Engine enclosure 12 includes a top 22, side panels 24, 26 (only one side shown in FIG. 1) and opposite ends between end 14 and cab 20. Side panels 24, 26 of engine enclosure 12 provide protection of the engine from the exterior environment, while permitting access of the engine and other components for maintenance or other reasons.

Figure 2:
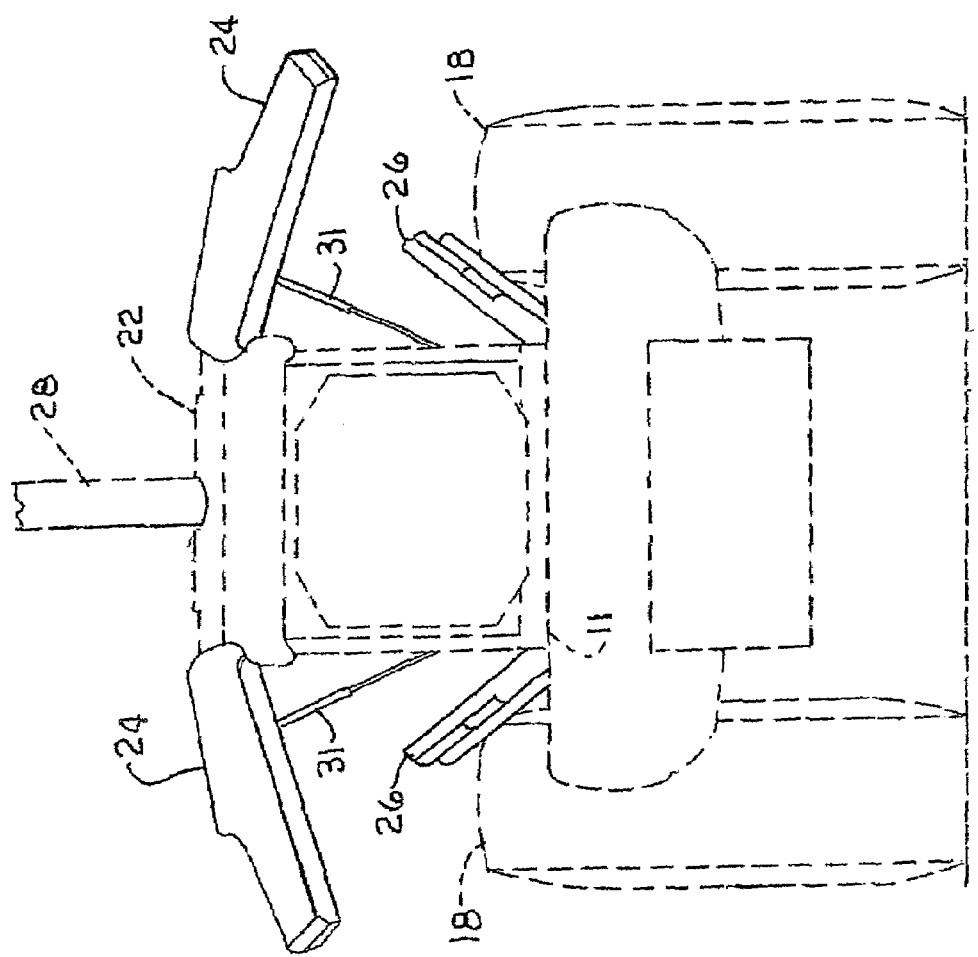
FIG. 2 is an end view of a work machine including an embodiment of an engine enclosure in an open position of the present invention.
Figure 3:
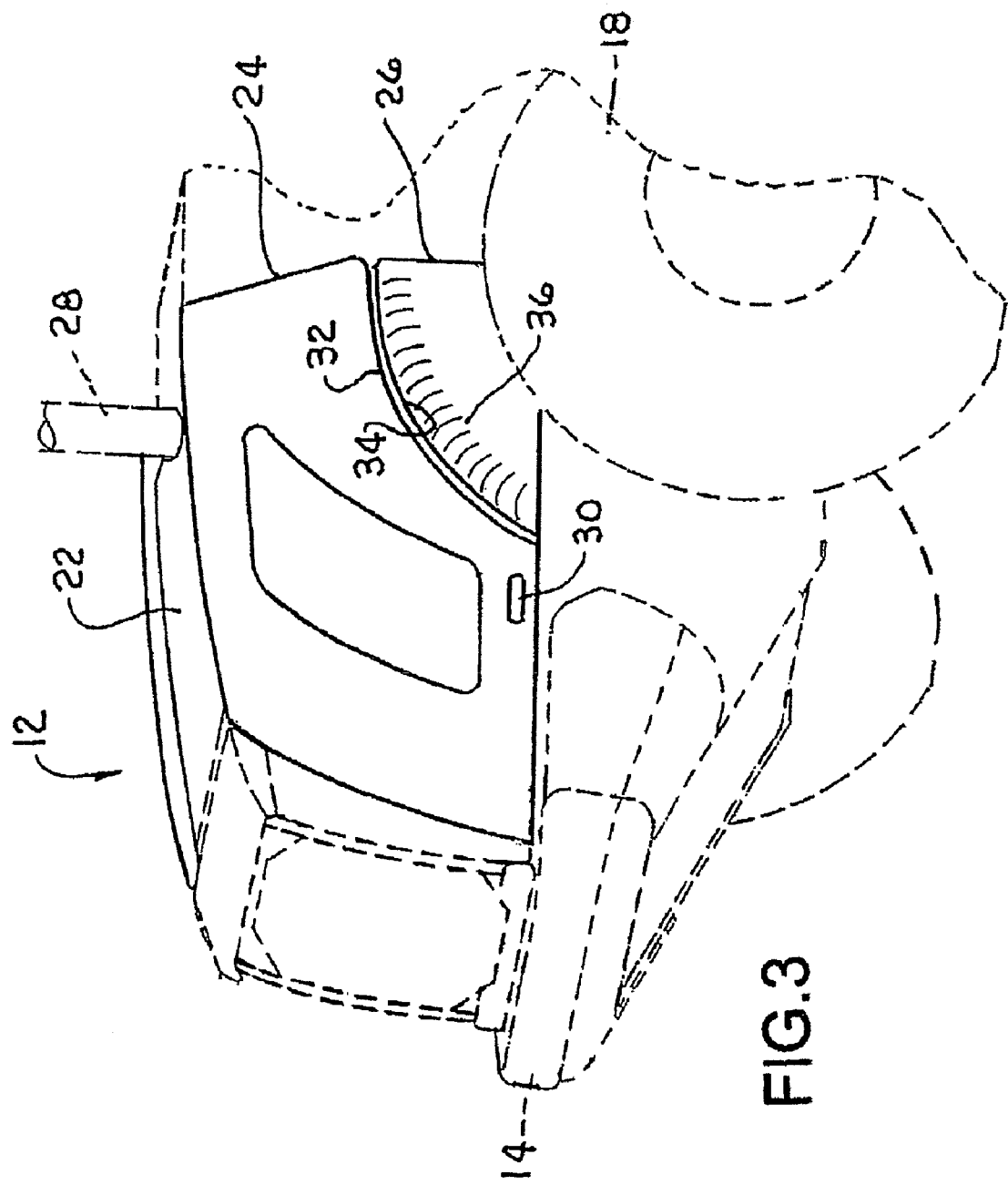
FIG. 3 is an enlarged partial perspective view of an embodiment of an engine enclosure in a closed position of the present invention.
Figure 4:
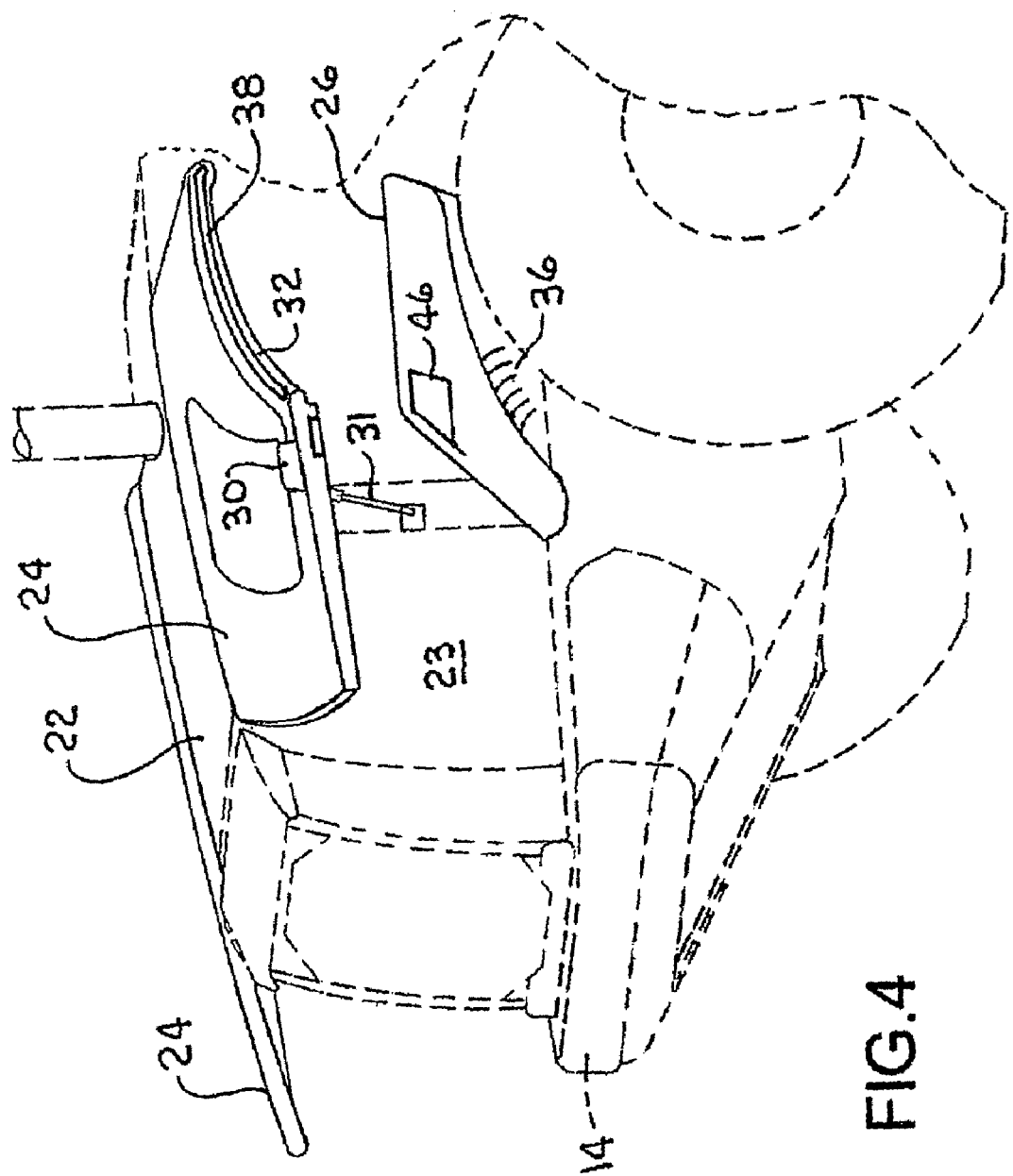
FIG. 4 is an enlarged partial perspective view of an embodiment of an engine enclosure in an open position of the present invention.

As shown in FIGS. 2-4, top 22 provides clearance for an exhaust pipe 28 extending substantially vertically from an engine 23 housed within engine enclosure 12. In one embodiment, top 22 may be of unitary construction. First side panel 24 is hingedly supported from the top of engine enclosure 12 and extends downwardly therefrom. In one embodiment, first side panel 24 is hingedly connected to top 22, while in another embodiment the first side panel 24 is hingedly connected to the work machine frame 11. In yet another embodiment, first side panel 24 is hingedly connected to both the work machine frame 11 and top 22. In a closed position (FIG. 3), first side panel 24 is maintained in close proximity with engine 23, while in an open position (FIG. 4), first side panel 24 is pivoted outwardly from the engine sufficient to provide access to the engine, and is maintained in the open position by a support strut 31. As shown, first side panel 24 is configured to comprise a substantial portion of the side of engine enclosure 12, while maintaining clearance with drive device 18 when first side panel 24 is pivoted between open and closed positions. First side panel 24, as shown, includes a latch 30 that maintains the first side panel 24 in a closed position. However, upon actuation of latch 30, first side panel 24 can be pivoted from the closed to the open position.

As further shown in FIGS. 2-4, second side panel 26 is hingedly supported from frame 11 along a junction between the side and the bottom of engine enclosure 12 and extends upwardly therefrom. In a closed position (FIG. 3), second side panel 26 is maintained in close proximity with engine 23 (not shown in FIG. 5), while in an open position, second side panel 26 is pivoted outwardly from the engine to provide access to the engine, and is maintained in the open position by force of gravity. Second side panel 26, as shown, optionally includes a latch 46 that maintains the second side panel 26 in a closed position. In one embodiment, latch 46 is not required due to an overlapping interlocking or engaging arrangement between a lower portion 32 of first side panel 24 and an upper portion 34 of second side panel 26 when the side panels 24, 26 are in a closed position (FIG. 3).

In another embodiment, a resilient layer 38 (FIG. 4) is secured to at least a fraction of the lower portion 32 of first side panel 24 so that when the side panels 24, 26 are in a closed position, the resilient layer 38 significantly reduces vibration between the side panels 24, 26. In yet another embodiment, resilient layer 38 is secured to at least a fraction of the upper portion 34 of second side panel 26, although the resilient layer may be secured to both the lower portion 32 of first side panel 24 and the upper portion 34 of second side panel 26. While resilient layer 38 can be a single contiguous layer of material, the resilient layer 38 can also define an open geometry, such as a hollow circular portion, as is known, for forming a bubble seal between the side panels 24, 26.

Figure 6:
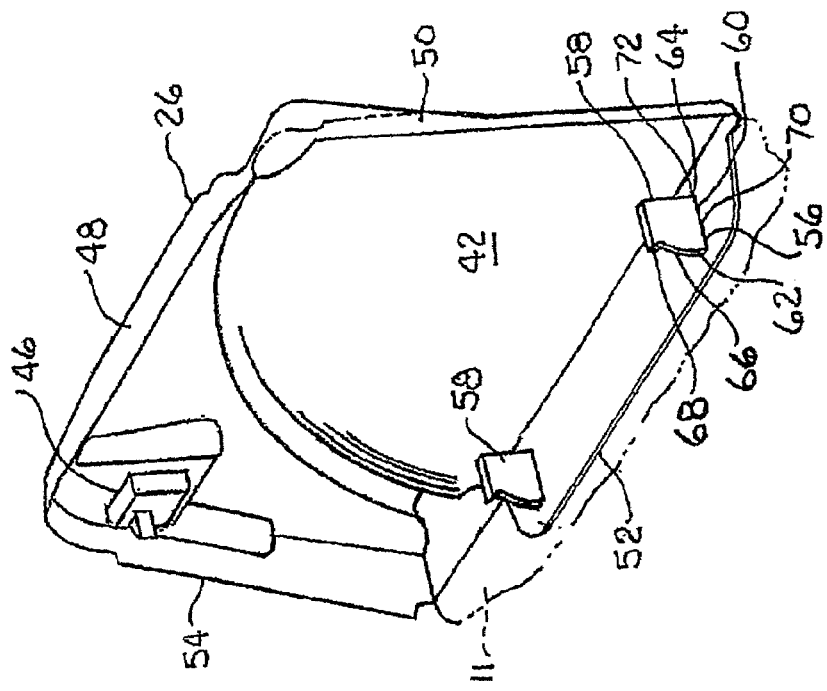
FIG. 6 is perspective view of an embodiment of a side panel opposite that of FIG. 5 of an engine enclosure of the present invention.
Figure 5:
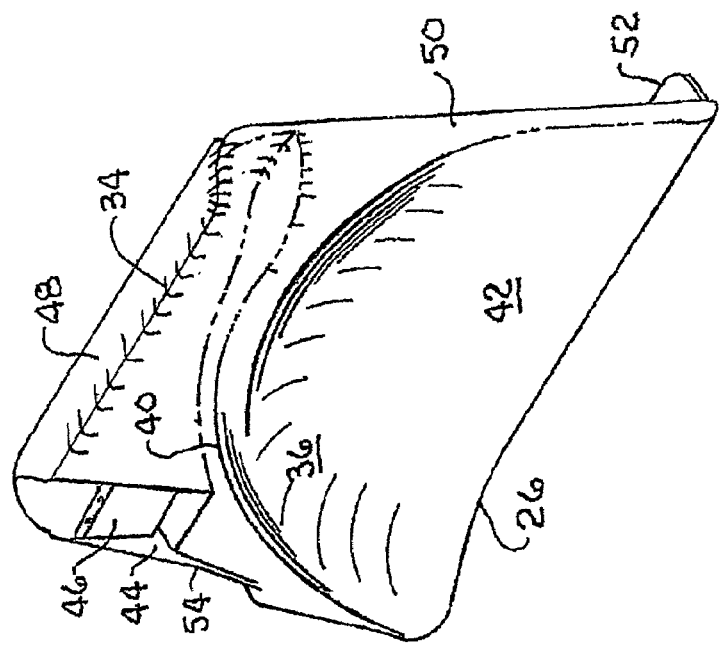
FIG. 5 is perspective view of an embodiment of a side panel of an engine enclosure of the present invention.

FIGS. 5 and 6 show respective embodiments of opposed second side panels 26, FIG. 6 second side panel designated as 26'. In one embodiment, the second side panels 26, 26' of FIGS. 5 and 6 are mirror image constructions. As shown, second side panels 26, 26' include an upper flange 48 and an opposed lower flange 52 separated by side flanges 50 and 54. In one embodiment, flanges 48, 50, 52, 54 are substantially contiguous and define the periphery of second side panels 26, 26', providing enhanced structural stiffness and strength. Second side panels 26, 26' include a contoured portion 36 configured so that the second side panels are in close conformal proximity with drive device 18 when the second side panels 26, 26' are in an open position (see FIG. 2). That is, when second side panels 26, 26' are in the open position, a recessed region 42 of contoured portion 36 is configured to substantially conformally receive the corresponding portion of drive device 18. This conformal fitting relation permits the magnitude of the pivot angle between the closed position and the second side panels 26, 26' to be maximized, similarly permitting maximum access to the exposed engine components. In an alternate embodiment, the open position may permit second side panels 26, 26' to pivot to form an abutting contact with drive device 18, providing even further enhanced access to the engine components.

In one embodiment, contoured portion 36 includes a ridge 40 that extends into recessed region 42 between ridge 40 and flange 52 for receiving a corresponding portion of drive device 18 when second side panels 26, 26' are in an open position. Further, ridge 40 provides increased structural stiffness and strength. In one embodiment, lower portion 32 of first side panel 24 abuts upper portion 34 of second side panel 26 adjacent to a region of ridge 40 that is adjacent to flange 48 when the side panels are in a closed position (see FIG. 3).

As shown in FIG. 6, a pair of hinge blocks 58 provide both a tapered retention feature, when second side panels 26, 26' are in the closed position, and a controlled, hinged rotation path when the second side panels 26, 26' are pivoted between open and closed positions. In addition, a stop 68 provides a maximum rotation position, i.e., a maximum angular magnitude in the open position as measured from the closed position for second side panels 26, 26'. Moreover, hinge blocks 58 permit optional removal of second side panels 26, 26' from the work machine when the second side panels are adjacent to the closed position and the open position. In one embodiment, hinge block 58 is secured to frame 11 of the work machine with a base 60 of the hinge block abutting the frame. Hinge block 58 includes a curved portion 66, such as an arcuate shape that is radially disposed from a corner 72 of base 60, which curved portion terminating at a stop 68. This novel hinge block construction provides an increased cross-sectional area as defined by planes parallel to flange 52 in the closed position cutting through hinge block 58.

As further shown in FIG. 6, second side panels 26, 26' include slotted apertures 56 formed in flange 52 to receive corresponding hinge blocks 58. In one embodiment, hinge block 58 defines a maximum distance between curved portion 66 and corner 72 as measured along base 60. In another embodiment, the distance from any location of curved portion 66 and corner 72 is substantially the same. In yet another embodiment, ends 62 and 64 of slotted aperture 56 are sized so that when second side panels 26, 26' are in the closed position, base 60 of hinge block 58 are sufficiently tightly secured in the corresponding slotted aperture to substantially prevent vibration during operation of the working machine. In addition, upon actuation of latch 46, second side panels 26, 26' may be pivoted about hinge block(s) 58. That is, end 64 of slotted aperture 56 remains substantially coincident with corner 72, while end 62 of slotted aperture 56 slides along the surface of curved portion 66 until flange 52 abuts stop 68 of hinge block 58, preventing further pivoting of second side panels 26, 26'. In another embodiment, second side panels 26, 26' abut drive device 18 (not shown in FIG. 6) prior to flange 52 of second side panel 26, 26' abutting stop 68. It is to be understood that once second side panels 26, 26' pivot sufficiently to clear first side panel 24, which in one embodiment is about a 5 degree pivot from the closed position, panels 26, 26' can be removed from the work machine, if desired. Alternately, second side panels 26, 26' can be further pivoted toward stop 68, although the second side panels may be removed at any angular position between a position adjacent to the closed position and the open position.

It is to be understood that side panels 24, 26 can be constructed of metal or nonmetals, such as plastic, and that hinge block 58 can similarly be composed of metal or nonmetal, or that either side panels 24, 26 or hinge block 58 can be composed of another suitable material having sufficient structural stiffness, strength and vibrational damping qualities to reduce noise during operation of the work machine. In one embodiment, a resilient material, such as foam rubber may be disposed between hinge block 58 and flange 52 of the second side panels 26, 26'.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An engine enclosure for enclosing an engine of a work machine, the enclosure comprising:
    a first panel hingedly supported from an enclosure top and extending downwardly therefrom to form an enclosure side portion;
    a first hinge device joining the first panel to the enclosure top for pivotal movement relative thereto, the first panel pivotable from a closed position to an open position for access of engine components without the first panel contacting a drive device of the work machine;
    a second panel hingedly supported and forming another portion of the enclosure side, extending upwardly toward the first panel, wherein a lower portion of the first panel is configured to overlie an upper portion of the second panel when the first and second panels are in a closed position for preventing pivotal movement of the second panel when the first panel overlies the second panel; and
    wherein the second panel is pivotable from the closed position to an open position for access of engine components.

2. The engine enclosure of claim 1, wherein the second panel includes a latch device to secure the second panel in the closed position when the first panel is in the open position.

3. The engine enclosure of claim 1, wherein the second panel is contoured to be in at least one of close conformal proximity and conformal abutting contact with the drive device when disposed in the open position.

4. The engine enclosure of claim 1, wherein the second panel is removable without tools once the second panel is pivoted a predetermined amount from the closed position.

5. The engine enclosure of claim 1, wherein a resilient layer is secured along at least a fraction of the lower portion of the first panel to resiliently abut a corresponding region of the upper portion of the second panel when the first and second panel are in the closed position.

6. The engine enclosure of claim 5, wherein the resilient layer forms a bulb seal between the first and second panel.

7. The engine enclosure of claim 1, wherein a resilient layer is secured along at least a fraction of the upper portion of the second panel to resiliently abut a corresponding region of the lower portion of the first panel when the first and second panel are in the closed position.

8. The engine enclosure of claim 7, wherein the resilient layer forms a bulb seal between the first and second panel.

9. The engine enclosure of claim 1, wherein the second panel is a nonmetal.

10. The engine enclosure of claim 1, wherein the second panel is a plastic.

11. The engine enclosure of claim 1, wherein the second panel is pivotably connected to a pivot block.

12. The engine enclosure of claim 1, wherein the drive device is a wheel.

13. The engine enclosure of claim 1, wherein the drive device is a drive track.

14. The engine enclosure of claim 1, wherein the second panel is pivotable from the closed position to an open position for access of engine components without the second panel contacting the drive device of the work machine.

15. A work machine comprising:
    an engine and an engine enclosure, the engine enclosure comprising:
        a first panel hingedly supported from an enclosure top and extending downwardly therefrom to form an enclosure side portion;
        a first hinge device joining the first panel to the enclosure top for pivotal movement relative thereto, the first panel pivotable from a closed position to an open position for access of engine components without the first panel contacting a drive device of the work machine;
        a second panel hingedly supported and forming another portion of the enclosure side, extending upwardly toward the first panel, wherein a lower portion of the first panel is configured to overlie an upper portion of the second panel when the first and second panels are in a closed position for preventing pivotal movement of the second panel when the first panel overlies the second panel; and
        wherein the second panel is pivotable from the closed position to an open position for access of engine components.

16. The work machine of claim 15, wherein the second panel includes a latch device to secure the second panel in the closed position when the first panel is in the open position.

17. The work machine of claim 15, wherein the second panel is contoured to be in close conformal proximity with the drive device when disposed in the open position.

18. The work machine of claim 15, wherein the second panel is removable without tools once the second panel is pivoted a predetermined amount from the closed position.

19. The work machine of claim 15, wherein a resilient layer is secured along at least a fraction of the lower portion of the first panel to resiliently abut a corresponding region of the upper portion of the second panel when the first and second panel are in the closed position.

20. The work machine of claim 15, wherein the second panel is pivotably connected to a pivot block.

* * * * *